United States Patent [19]

Pardue

[11] Patent Number: 5,349,772
[45] Date of Patent: Sep. 27, 1994

[54] FLEXIBLE FRAME MOBILE DISPLAY
[75] Inventor: Jon P. Pardue, Commerce, Ga.
[73] Assignee: Patterson's Mobile Media, Inc., Duluth, Ga.
[21] Appl. No.: 842,516
[22] Filed: Feb. 27, 1992
[51] Int. Cl.⁵ .......................................... G09F 21/04
[52] U.S. Cl. ...................................... 40/590; 40/603
[58] Field of Search ................. 40/603, 590, 591, 604, 40/589, 611, 617; 160/368.1, 127

[56] References Cited

U.S. PATENT DOCUMENTS

| | | |
|---|---|---|
| 1,721,804 | 7/1929 | Connell . |
| 2,724,917 | 11/1955 | Norfleet . |
| 3,958,350 | 5/1976 | Garson . |
| 4,041,861 | 8/1977 | Alter . |
| 4,580,361 | 4/1986 | Hillstrom et al. . |
| 4,754,566 | 7/1988 | Gordon . |
| 4,756,107 | 7/1988 | Hillstrom . |
| 4,922,988 | 5/1990 | Loomis ................................ 40/603 |
| 5,044,102 | 9/1991 | Finch et al. . |
| 5,058,299 | 10/1991 | Suzuki .................................. 40/603 |

FOREIGN PATENT DOCUMENTS 2636161  3/1990  France .

*Primary Examiner*—Kenneth J. Dorner
*Assistant Examiner*—J. Silbermann
*Attorney, Agent, or Firm*—Hoffman, Wasson & Gitler

[57] ABSTRACT

A flexible frame adapted to removably secure a flexible advertising material to the exterior of a vehicle such as a truck trailer. When affixed to the side panels of a trailer, a series of opposed clamps connected to each other by a tensioned rod would firmly keep the flexible material under tension.

8 Claims, 6 Drawing Sheets

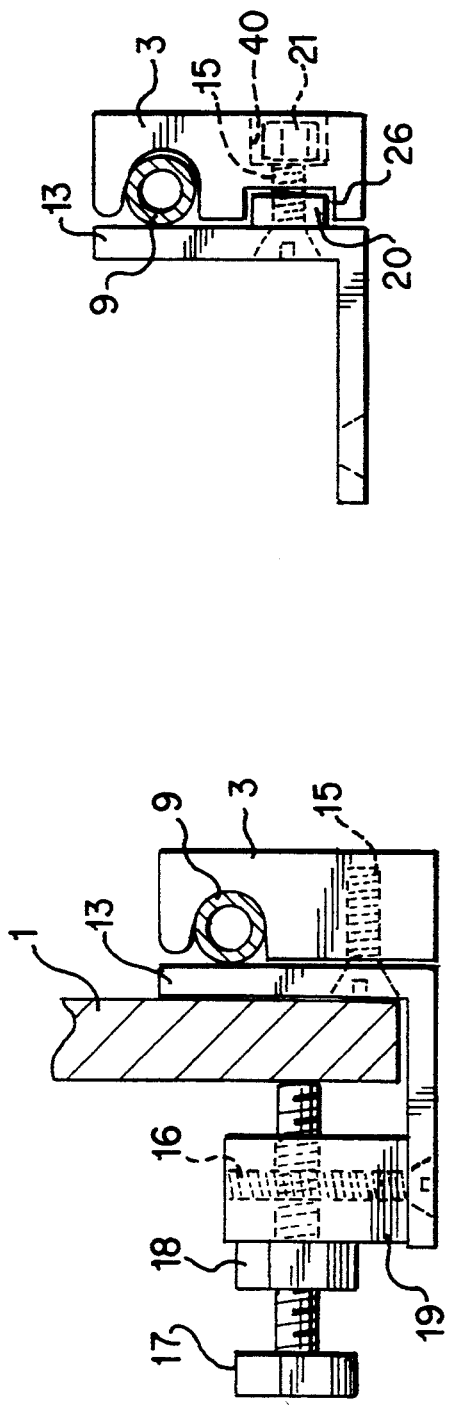
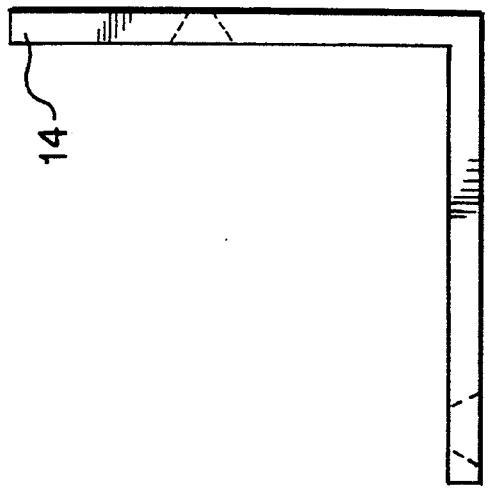
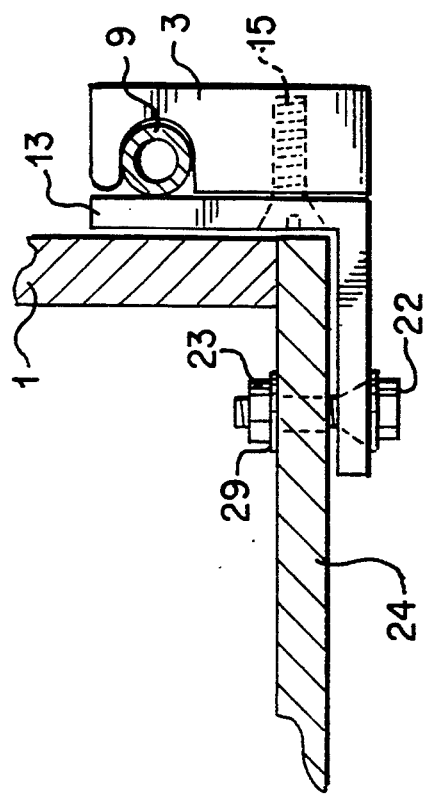
FIG. 3A
FIG. 3B
FIG. 3C
FIG. 3D

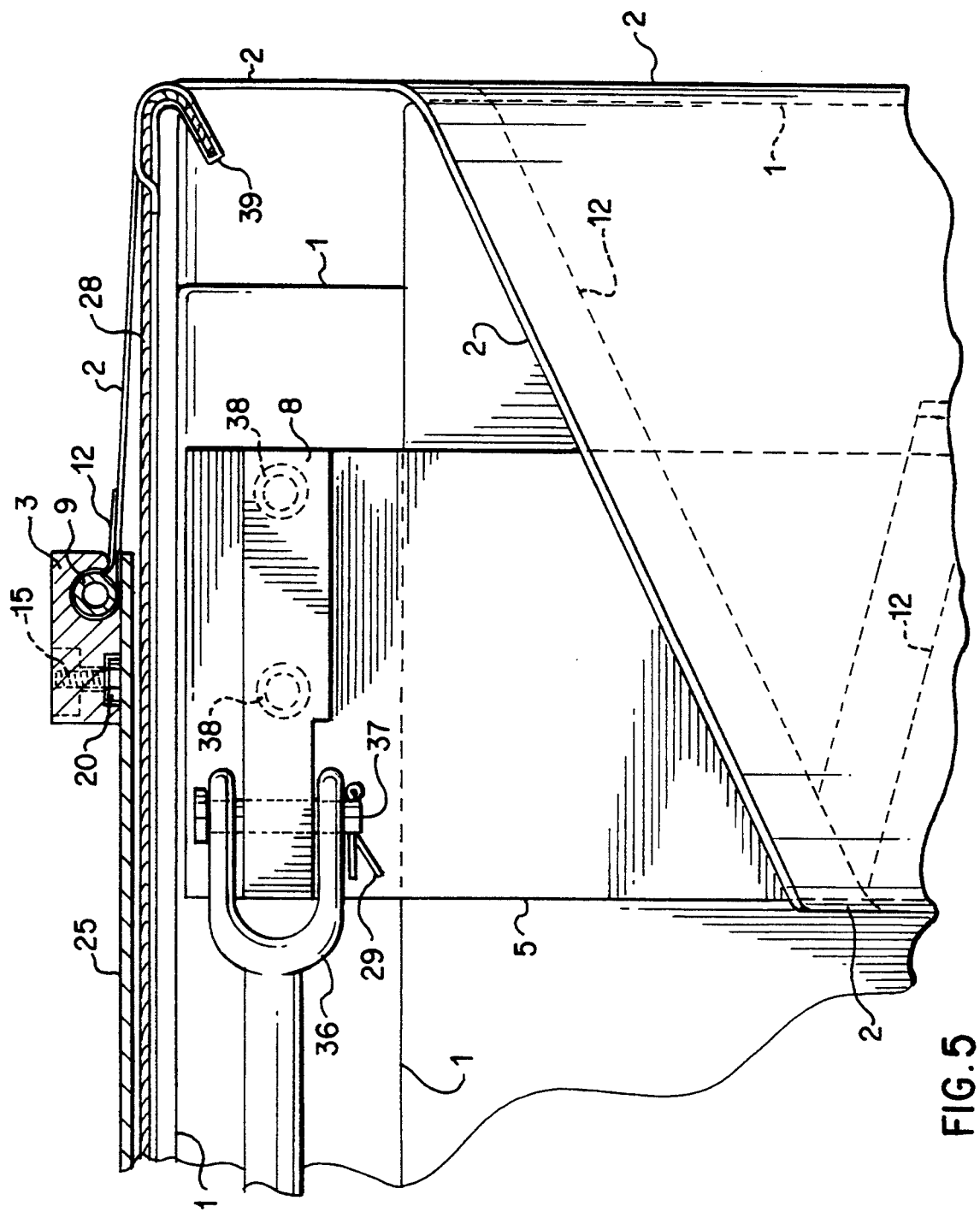

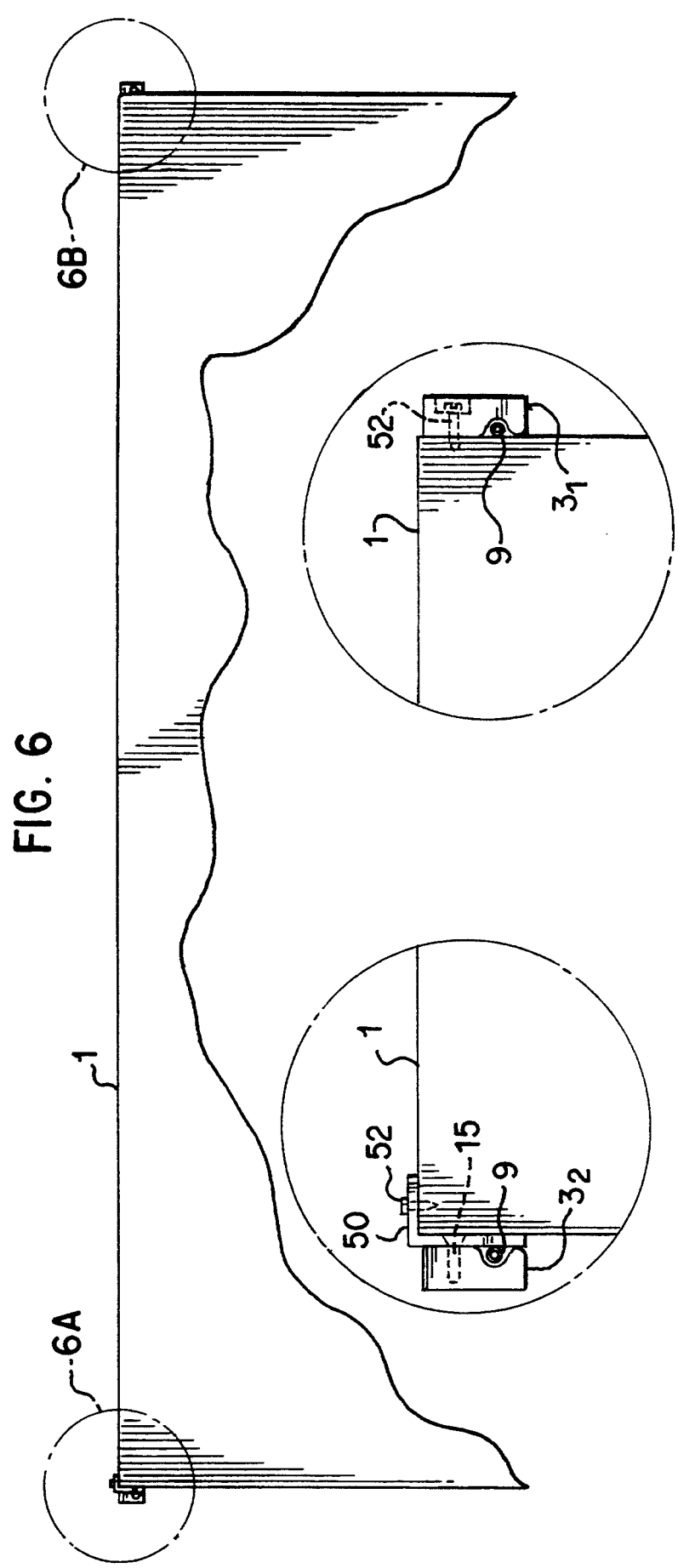

FLEXIBLE FRAME MOBILE DISPLAY

BACKGROUND OF THE INVENTION

Certainly the linchpin of today's economy is the buying and selling of various products and services. In order to educate the public at large of the existence and availability of these products and services, various types of advertisements are employed. These advertisements can take many different forms or utilize a number of different media such as newspapers, magazines, television, ratio and roadside billboards, to name just a few. Consistent with the use of roadside billboards, many advertisers are using automobiles or trucks to publicize their goods or services. Historically, when a truck or similar vehicle is used as the advertising medium, a sign is painted on the exterior of the truck or is permanently affixed to the outside surface. Typical of these permanent signs are those described in U.S. Pat. Nos. 2,724,917 to Norfleet and 3,958,350 issued to Garson or in French Patent 2,636,161. While these signs would certainly provide an adequate technique to advertise goods or services associated with a particular freight container due to their relatively permanent nature, they are particularly efficacious if they are owned or operated by the company whose goods are transported with the trucks, or whose services are associated with the truck.

This would not be the case with respect to independent truckers who operate their own rigs or trucks which are rented for impermanent use. In this situation, a system for non-permanently utilizing the exterior of a vehicle must be developed as an advertising device.

SUMMARY OF THE INVENTION

The deficiencies of the prior art are alleviated by the present invention which utilizes a flexible advertising material which is provided, under tension, to the exterior surface of a freight container such as a truck trailer, semi-trailer and shipping container having substantially flat exterior surfaces. A number of clamps are used to provide both top-to-bottom tensioning of the flexible advertising material as well as front-to-rear tensioning of the flexible advertising material. These clamps enable the flexible advertising material to be applied over the exterior surface or surfaces or the transport container in a non-permanent fashion. These claps are bolted in place and can easily be removed for charging the content of the flexible advertising medium relatively quickly and inexpensively.

Furthermore, the flexible material may be provided with non-advertising material, such as artistic works, which would alter the exterior appearance of a container or vehicle in a positive manner.

The above and other objects, features and advantages of the present invention will become apparent from the following description, taken in conjunction with the accompanying drawings.

BRIEF DESCRIPTION OF THE DRAWINGS

FIGS. 3A, 3B and 3C illustrate various clamping arrangements used in the present invention;

FIG. 3D illustrates an alternate embodiment of the jaw mount used in the present invention;

FIG. 5 is a view of a portion of the end of the freight container; and

FIG. 6 is a front view of the freight container provided with an exploded view of the clamps used in the present invention.

DETAILED DESCRIPTION OF THE PRESENT INVENTION

Figure 1:
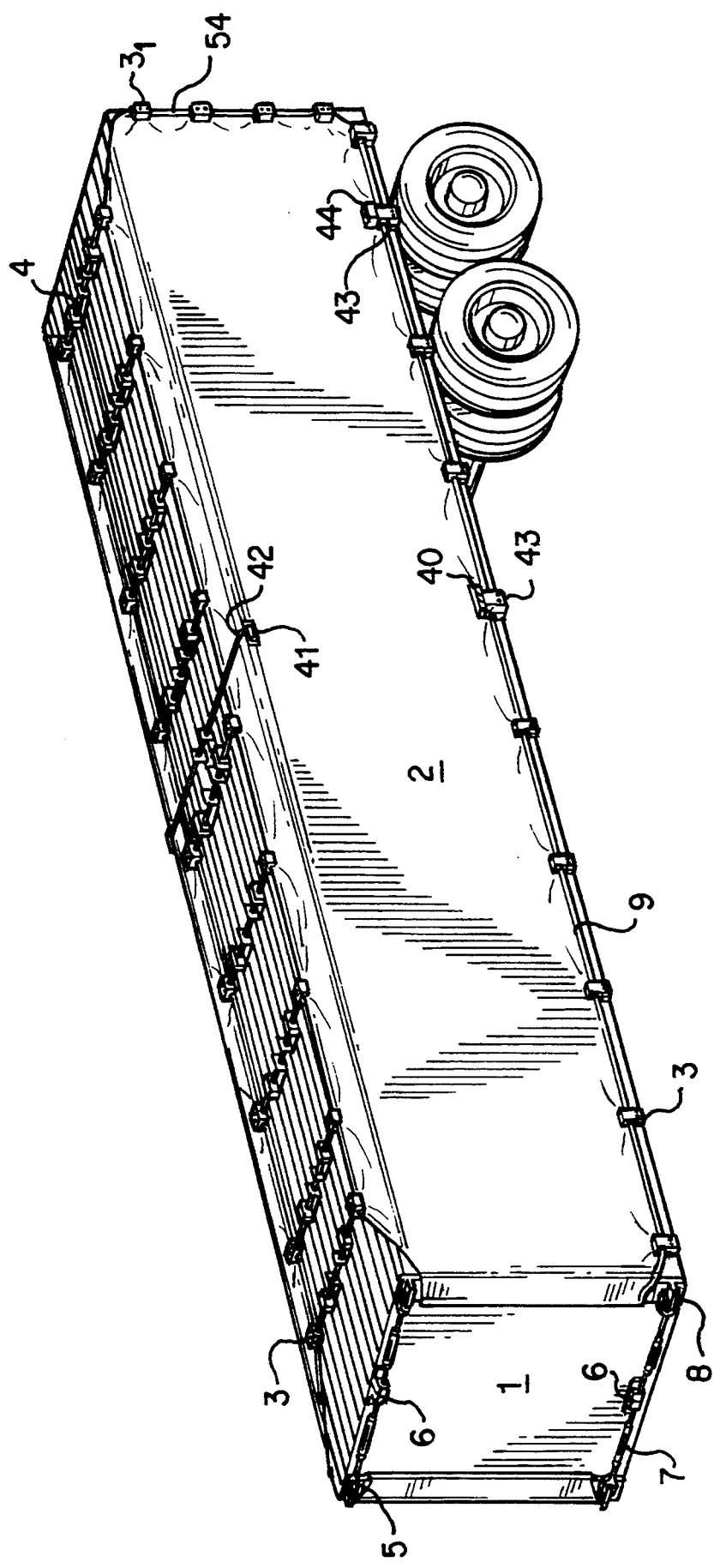
FIG. 1 is a perspective view of a fright container exhibiting the flexible advertising material.

FIG. 1 illustrates the use of the present invention installed on a trailer 1. It is noted that the flexible advertising material 2 can be applied to the exterior surfaces of any shipping container having flat sides. However, for purposes of simplicity, we will refer to the use of the flexible advertising material 2 associated with the trailer 1. The flexible material 2, which is similar in nature to the material used by the outdoor billboard advertising industry has an advertising message or logo provided thereon by many different methods, such as being hand-painted, painted by computer or an adhesion technique. A plurality of clamps 3 are provided at discrete locations on the top surface of the trailer 1 as well as on the bottom surface of the trailer 1. Opposed clamps 3 are connected to one another utilizing a threaded rod 4. These rods would connect the clamps 3 on the top surface of the trailer 1 as well as on the bottom surface of the trailer 1 to form pairs of clamp combinations. Additionally, a plurality of these clamps 3 could be provided on the corner side surface of the trailer 1, as shown in FIG. 1. The flexible material 2 is stretched and tensioned by these clamps 3 to a certain, adjustable tension. The flexible material is stretched and tensioned to the point that it does not flutter or move even at high vehicular speeds in the range of 80–90 mph. Additionally, it should be noted that trailers, in general, tend to flex while in transit. Bumps and swells in the road, and tire vibration, coupled with the weight of the freight within the trailer would tend to exaggerate this flexion. Therefore, it is imperative that the flexible material 2 must flex along with the trailer, particularly along the greatest length of the trailer. For this reason, a continuous frame or extrusion is not used, but rather a firm clamped area, followed by approximately 12 times the clamped distance, frame from clamps.

Figure 4B:
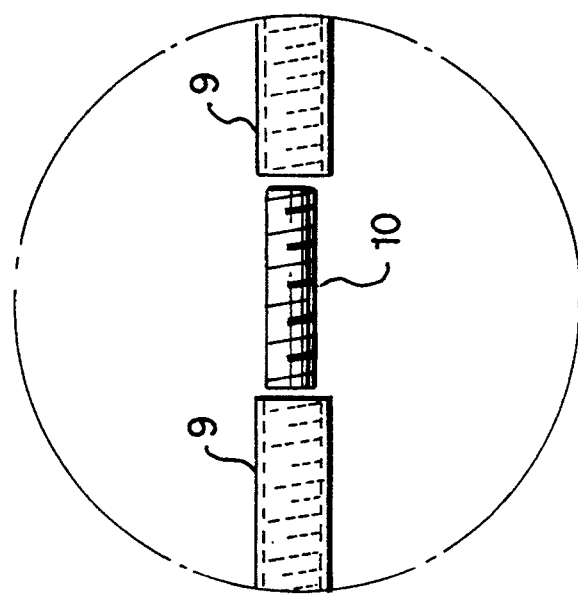
FIG. 4 is an exploded view of a portion of a hollow tube used to tension the flexible advertising material.
Figure 4A:
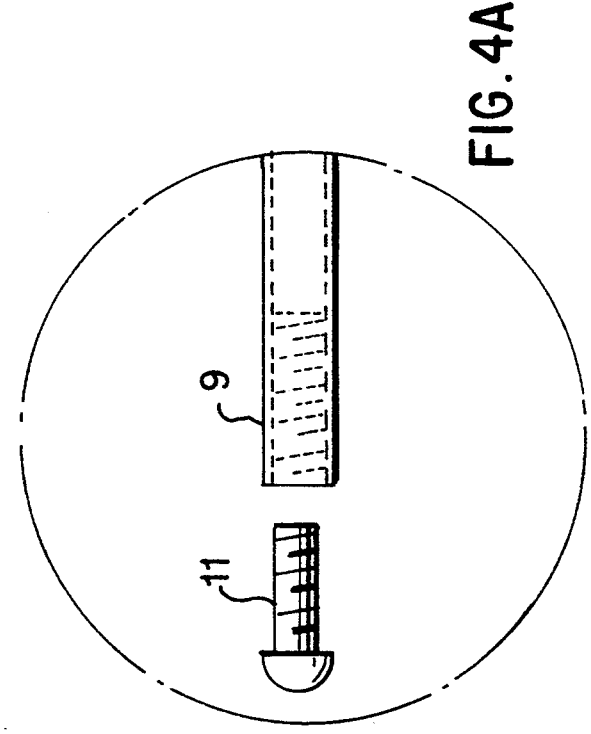
Figure 4:
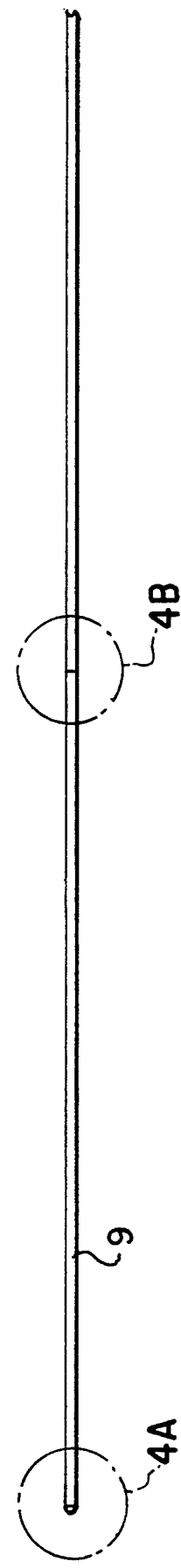

The clamps 3 are designed to tension the flexible material 2 such that the material would flex along with the trailer, but would remain relatively immobile, even at high operating speeds. Furthermore, these clamps 3 are designed so that they may be able toe removed and assembled relatively quickly without affecting the outward appearance of the trailer. This result is accomplished by utilizing a plurality of clamps 3, as shown in FIG. 1, whereby the flexible material 2 is clamped between an elongated, hollow tube 9 placed through the hem 12 in the perimeter of the flexible material 2. This tube 9 is designed to be placed in both the bottom side surfaces of the trailer 1 as well as the top side surfaces. This tube would provide a straight edge appearance and afford a strong perimeter for restraining the flexible material 2 with the clamping devices 3. As shown in FIG. 4, this tube 9 would not extend for the entire length of the trailer but is compared of a plurality of shorter tubes which are threaded together via a stud 10. A rounded bolt 11 is provided at either end of the tube 9. The shorter length of these tubes 9 would facilitate shipping and would allow ready conformance to various trailer sizes. During installation, the hollow tube 9 could be cut to exactly conform to the size of the particular trailer.

The clamp 3 is designed to tightly clamp the hollow tube 9 and the flexible material 2. Based upon the particular construction of the trailer, the clamp 3 is attached to a variety of components which are provided on the trailer, while endeavoring to reduce the damage (i.e. holes) to the trailer caused by installing the flexible advertising medium. Due to this consideration, as well as the operating flexion of the trailer, the present invention utilizes tension and compression clamping devices in all possible locations, rather than bolting a frame having advertising material thereon to the trailer, as provided in the prior art.

Various types of clamps 3 used in the present invention are illustrated in FIG. 3A, FIG. 3B and FIG. 3C. As shown in FIG. 3A, the clamp 3, having hollow tube 9 provided within the hem 12 of the flexible material 2, is affixed to the trailer utilizing two bolts 15. Since FIG. 3A shows the clamp 3 in a side view, only one of the bolts 15 is visible. A threaded block 19 is attached to a jaw mount 13 utilizing one or more bolts 16. A transverse bolt 17 and nut 18 are threaded through the block 19, affixing the jaw amount 13 as well as the tensioned clamp 3 to the trailer 1. The threaded block 19, when bolted with the bolts 16 to the jaw mount 13, would create a compression clamp with pressure exerted by the bolt 17 on trailer 1. The nut 18 locks the bolt 17 in place so that the assembly will remain firmly clamped. This particular embodiment of clamp 3 would prevent easy removal of the bolts 15, thereby preventing vandalism, as well as providing an aesthetically pleasing appearance. However, a disadvantage of this embodiment would be that it is relatively difficult to properly install, and the flexible material 2 must be relieved of top-to-bottom tension before it is possible to remove the clamp 3. Therefore, a great deal of time is needed to remove an old advertising message and replace it with a new advertising message.

An improved embodiment of this clamp 3 is shown in FIG. 3B. A groove 26 is provided in the clamp 3 to accept a nutplate 20 to secure the bolts 15 to the jaw mount 13. The outward face of the clamp 3 is provided with recesses 40 for the nuts 21 associated with bolts 15. In this embodiment, everything but the clamp 3 is tightly installed on the trailer, so that it may be removed and installed independently of the rest of the assembly. Due to the section profile of this clamp, extrusion techniques may be employed for its manufacture, thereby reducing to a minimum the cost and time required to machine the clamp.

While the clamps 3 illustrated in FIGS. 3A and 3B can be applied to virtually any exterior location on many trailers 1, this would not be the case for those clamps applied to the front three or four feet of the bottom of most trailers. Typically, a very heavy steel plate 24 is welded to the bottom of the trailer to provide strength to this area, since all inertial forces of the trailer are connected to the tractor unit in the center of plate 24. In this area, the clamp 3 will be affixed to the steel plate 24, as shown in FIG. 3C by attaching the jaw mount 13 to the plate 24 with bolt 22, nut 23 and lock washer 29. Alternatively the plate 24 is threaded to accept the bolt 22 used with the lock washer 29. In this situation, the threaded block 19 shown in FIG. 3A is not necessary.

FIG. 3D illustrates a jaw mount 14 which is larger than the jaw mount 13 illustrated in FIGS. 3A, 3B and 3C. This jaw mount is used when the bottom of the trailer has an offset opening. The dimensions of the jaw mount 14 will vary according to the dimensions of the trailer. Since the jaw mount 14 would be the only part of the clamp assembly that would change to adapt the present invention to offset bottom trailers, the cost of converting the system used in FIGS. 3A, 3B or 3C would be relatively small since only one of the parts would change in dimensions. The combination of the clamp 3, hollow tube 9, jaw mount 13 and various securing bolts act to grip one of the sheets of the flexible material and to fasten this sheet to one of the exterior surfaces of the movable freight container.

FIG. 6 shows an exploded view of clamps $3_1$ and $3_2$ which are used with a vertical member 54 at the rear of the trailer 1. In one embodiment, holes are drilled in the side of the trailer by a Tek screw 52 which would attach clamp $3_1$ to the trailer. Alternatively, a hole is made by the Tek screw 52 in the top of the trailer 1 to utilize a jaw mount 50 to attach the clamp $3_2$ to the trailer. These holes are drilled by the Tek screws which are rotated by an electric drill and an adapter. Although FIG. 6 illustrates a clamp similar to the clamp shown in FIG. 3A, it should be noted that the clamp illustrated in FIG. 3B including a nutplate 20 may also be used with the jaw mount 50.

Figure 2:
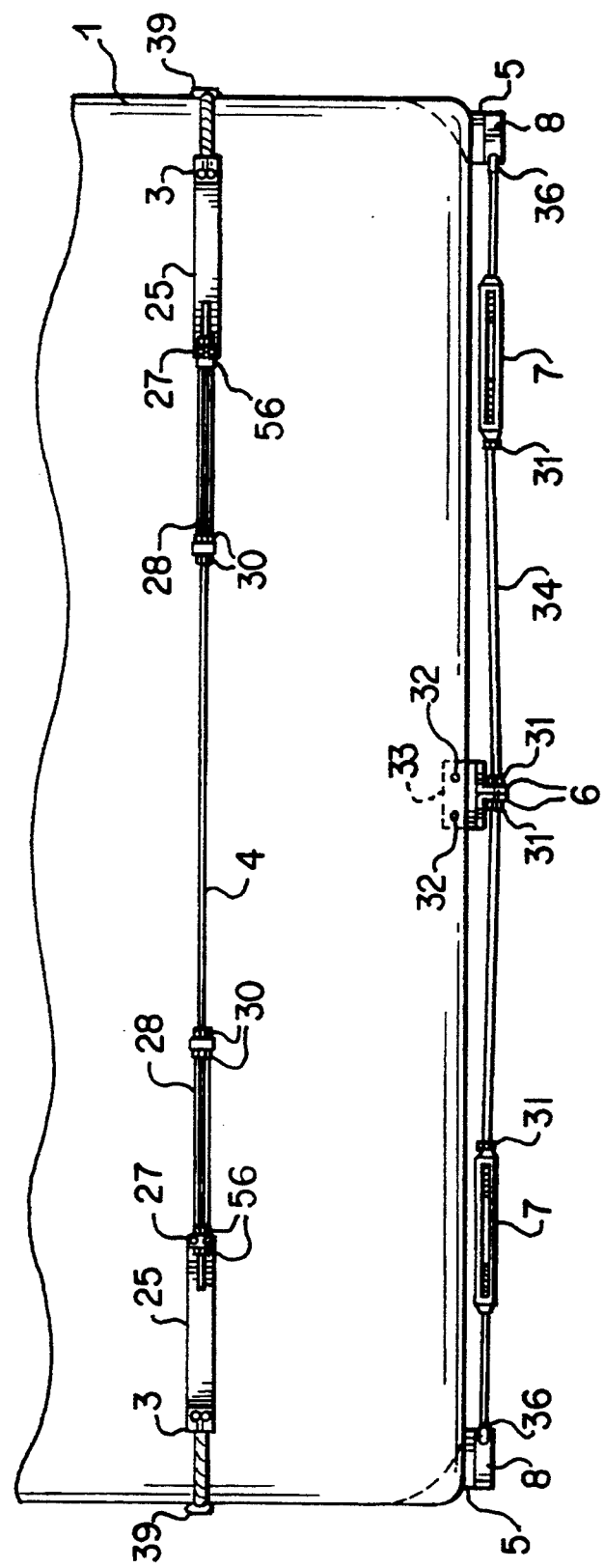
FIG. 2 is a top view of a portion of the freight container in FIG. 1.

The top-to-bottom tensioning mechanism is shown with respect to FIG. 2 and FIG. 5. This mechanism includes a safety strap 28 which is connected to the threaded rod 4 provided on the roof of the trailer 1. It is noted that although FIG. 2 shows only a single threaded rod 4 and safety strap 28 combination, each of the opposed clamps provided on the top of the trailer 1 would be connected by such a system. Normally, the top-to-bottom tension of the flexible material 2 would offset each other. However, in the event that one side of the flexible material 2 was destroyed or lost tension, the safety strap 28 would keep the opposed side of the flexible material under normal tension. Nuts 30 would be used to connect the safety strap 28 to the threaded rod 4. This rod 4 is in turn connected to a tension bar 25 by use of a cross block 27 and nuts 56. As shown in FIG. 5, the clamp 3 is also affixed to the tension bar 25 at the top of the trailer. This should be contrasted with the clamp 3 shown in FIG. 3C which is rigidly affixed to the bottom of the trailer. The strap 28 would extend under the tension bar 25 and the hooked end of this strap would provide a hold-down for a protector 39 which is used to protect the rear of the flexible material 2 from chafing or tearing at the point that the edge of the safety strap 28 intersects the edge of the trailer. The cross block 27 is bolted to the tension bar 25 so that the flexible material 2 is tensioned upon tightening the nut 56 connected to the threaded rod 4. However, it should be noted that various mechanism could be utilized for providing tension control, and the scope of the present invention is not limited to the described threaded rod technique.

Front-to-rear tension on the flexible material 2 is provided by flat beams 5 which are inserted into the hem 12 of the flexible material and extend from the top of the trailer to the bottom of the trailer. Tension force is applied to the beams 5 through blocks 8 via a clevis 36 and turnbuckles 7 which in turn are connected to threaded rods 34. The block 8, clevis 36, turnbuckle 7 and threaded rod 34 combination is connected to angles 6 provided at both the top and bottom of the front surface of the trailer 1. As shown in FIG. 2, an angle 33 allows two angles 6 to be bolted to the top of the trailer by bolts and nuts 32. The bottom angles 6 are affixed to the trailer by Tek screws. A nut 31 is provided between each turnbuckle and its appropriate angle and is tightened to keep the turnbuckle from moving. Block 8 is attached to the clevis 36 with a clevis pin 37 secured by a cotter pin 29, thereby giving the beam 5 the ability to swivel. Bolts or screws 38 are used to attach the beam 5 to the block 8. In this manner, the front-to-rear tension mechanism can be applied to many different trailers whose front ends might be slightly different.

If the trailer is provided with hinged doors rather than roll-up doors, the hinged doors are typically held open by a hook on the sides of the body of the trailer. Since the flexible material 2 would cover up these hooks, they must be removed. In this situation, a special clamp 43 and adapter 44 are used to replace the standard clamp 3 and the original door hook.

If a light fixture is provided at the bottom of the trailer, the special clamp 43 maybe provided with a Freuhauf style marker lamp fixture. The circuits for this fixture will be connected to a suit the particular trailer.

If a light fixture is covered at the top of the trailer, a tension member 42 similar to the safety strap 28 is used with an adapter 41 to provide a replacement fixture mounting. A new Freuhauf style marker lamp fixture would also be used and connected to the appropriate circuits in the trailer.

If a reflector is covered by the flexible material 2, a self-adhesive reflector may be placed on one of the clams 3 or directly onto the flexible material 2. Similarly, a reflective self-adhesive strip can be placed on all or some of the visible clamps 3 as well as the flexible material 2.

The flexible frame of the present invention is designed to be made as light as possible with a thin profile so as to add little width to the trailer as well as not interfering with the payload capacity of the trailer. The aluminum parts utilized by this invention are anodized for protection from the elements and can be color-matched with the architectural finishes available to suit one's preference.

It is to be understood that the above-described arrangements are illustrative of the principles of the present invention. Numerous other arrangements or uses may be devised by those skilled in the art without departing from the spirit and scope of the invention. For example, the present invention can be utilized to display advertisements or messages on a stationary structure. The clamps 3 can be fastened directly to the surfaces of buildings or other structures. Furthermore, the flexible material 2 can be utilized on railway rolling stock.

What is claimed is:

1. A device for covering a portion of an external surface of a movable freight container with advertising material, comprising:

a first flexible sheet material having a plurality of edges and provided with indicia on its outside surface, said first flexible sheet material substantially covering at least one external surface of a movable freight container;

a plurality of first cable tensioning mechanisms for affixing and tensioning said first flexible sheet material to substantially cover a portion of at least one external surface of a movable freight container, each of said first cable tensioning mechanisms attached to said first flexible sheet material at discrete locations along a first of said edges of said first flexible sheet material by a first gripping and fastening means for gripping a portion of said first flexible sheet material and maintaining said first flexible sheet material in place, each of said first gripping and fastening means including a longitudinal tube, a clamping block having a longitudinal groove therein for gripping said first flexible sheet material between said longitudinal tube and said clamping block, said first gripping and fastening means further including an L-shaped jaw mount and a first fastening device for fastening said L-shaped jaw mounted to said clamping block and maintaining said longitudinal tube within said longitudinal groove of said clamping block, as well as a second fastening device extending through said L-shaped jaw mount transverse to said first fastening device;

a plurality of second cable tensioning mechanism for tensioning said first flexible sheet material to substantially cover at least one external surface of a movable freight container, each of said second cable tensioning mechanisms attached to said first flexible sheet material at discrete locations along a second of said edges of said first flexible sheet material by a second gripping and fastening means for gripping a portion of said first flexible sheet material and maintaining said first flexible sheet material in phase.

2. The device in accordance with claim 1, further including a plurality of third cable tensioning devices, a plurality of fourth cable tensioning devices and a second flexible sheet material provided with indicia therein and having a plurality of edges for substantially covering at least a portion of a second external surface of a movable freight container, each of said third cable tensioning devices attached to said second flexible sheet material at discrete locations along a first of said edges of said second flexible sheet material by a third gripping and fastening means for gripping a portion of said second flexible sheet material and maintaining said second flexible sheet material in place, each of said third gripping and fastening means including a longitudinal tube, a clamping block having a longitudinal groove therein for gripping said second flexible sheet material between said longitudinal tube and said clamping block, said third gripping and fastening means further including an L-shaped jaw mount and a third fastening device for fastening said L-shaped jaw mount to said clamping block and maintaining said longitudinal tube within said longitudinal groove of said clamping block as well as a fourth fastening device extending through said L-shaped jaw mount transverse to said third fastening device, said plurality of fourth cable tensioning devices attached to said second flexible sheet material at discrete locations along a second of said edges of said second flexible sheet material by a further gripping and fastening means for gripping a portion of said second flexible sheet material and maintaining said second flexible sheet material in place.

3. A device for covering a portion of an external surface of a movable freight container with advertising material, comprising:

a first flexible sheet material having a plurality of edges and provided with indicia on its outside surface, said first flexible sheet material substantially covering at least one external surface of a movable freight container;

a second flexible sheet material having a plurality of edges and provided with indicia on its outside surface, said second flexible sheet material substantially covering at least a second surface of a movable freight container;

a plurality of first cable tensioning mechanisms for affixing and tensioning said first flexible sheet material to substantially cover a portion of at least one external surface of a movable freight container, each of said first cable tensioning mechanisms attached to said first flexible sheet material at discrete locations along a first of said edges of said first flexible sheet material by a first gripping and fastening means for gripping a portion of said first flexible sheet material and maintaining said first flexible sheet material in place;

a plurality of second cable tensioning mechanisms for tensioning said first flexible sheet material to substantially cover at least one external surface of the movable freight container, each of said second cable tensioning mechanisms attached to said first flexible sheet material at discrete locations along a second of said edges of said first flexible sheet material by a second gripping and fastening means for gripping a portion of said first flexible sheet material and maintaining said first flexible sheet material in place;

a plurality of third cable tensioning devices attached to said second flexible sheet material at discrete locations along a first of said edges of said second flexible sheet material by a third gripping and fastening means for gripping a portion of said second flexible sheet material and maintaining said second flexible sheet material in place;

a plurality of fourth cable tensioning devices attached to said second flexible sheet material at discrete locations along a second of said edges of said second flexible sheet material by a fourth gripping and fastening means for gripping a portion of said second flexible sheet material and maintaining said second flexible sheet material in place;

wherein each of said first cable tensioning mechanisms is provided at a position opposite one of said third cable tensioning mechanisms and each of said second cable tensioning mechanisms is provided at a position opposite one of said fourth cable tensioning mechanisms, each of said second and fourth cable tensioning mechanisms physically joined to one another by a connecting device.

4. The device in accordance with claim 3 further including first, second, third and fourth elongated members, said first elongated member extending through each of said first cable tensioning mechanisms and provided between an external surface of a movable freight container and said first flexible sheet material, said second elongated member extending through each of said second cable tensioning mechanisms and provided between an external surface of a movable freight container and said first flexible sheet material, said third elongated member extending through each of said third cable tensioning mechanisms and provided between an external surface of a movable freight container and said second flexible sheet material and said fourth elongated member extending through each of said fourth cable tensioning mechanisms and provided between an external surface of a movable freight container and said second flexible sheet material.

5. The device in accordance with claim 4 wherein said gripping and fastening means of each of said first cable tensioning mechanisms includes a bolt extending through each of said first cable tensioning mechanisms as well as a nut for tightening each of said first cable tensioning mechanisms, each of said third cable tensioning mechanisms includes a bolt passing through each of said third cable tensioning mechanisms as well as a nut for tightening each of said third cable tensioning mechanisms.

6. The device in accordance with claim 3 wherein said second and fourth cable mechanisms include a clamp affixed to a tension bar.

7. The device in accordance with claim 6, further provided with a safety strap connected to each of said second and fourth connecting mechanisms and extending around the top surface of a movable freight container to the external side surfaces of a movable freight container.

8. The device in accordance with claim 3 wherein said first and second flexible sheet material covers a portion of the nose surface of a movable freight container, the device including horizontal beams provided between said first and second flexible sheet material and the nose surface of a movable freight container, and further including a means for applying front-to-rear tension on said first and second flexible sheet material connected between said horizontal beams and the movable freight container.

* * * * *